May 6, 1924.
O. MARTIENSSEN
GYROSCOPIC COMPASS
Filed Aug. 31, 1921
1,493,213
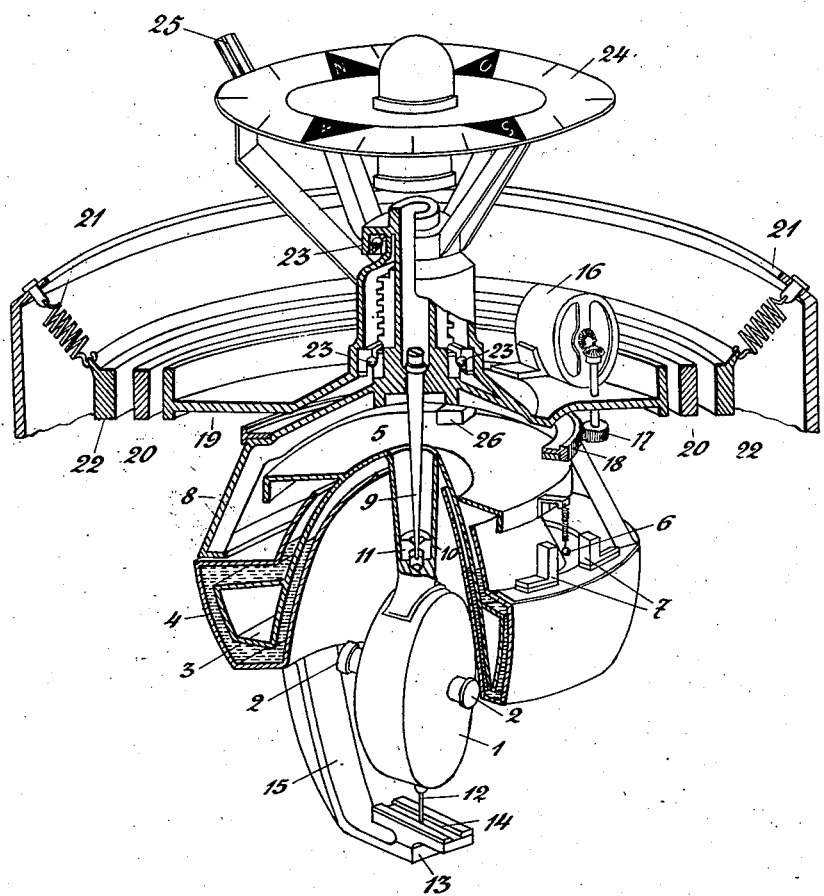
Inventor
Oscar Martienssen
By Knight Bros.
attorneys Patented May 6, 1924.

1,493,213

UNITED STATES PATENT OFFICE.

OSCAR MARTIENSSEN, OF KIEL, GERMANY.

GYROSCOPIC COMPASS.

Application filed August 31, 1921. Serial No. 497,417.

(GRANTED UNDER THE PROVISIONS OF THE ACT OF MARCH 3, 1921, 41 STAT. L., 1313.)

*To all whom it may concern:*

Be it known that I, OSCAR MARTIENSSEN, physicist, citizen of the German Republic, and residing at Kiel, county of Schleswig-Holstein, State of Prussia, Germany, have invented certain new and useful Improvements in Gyroscopic Compasses (for which I have filed applications for patent in Germany March 27th, 1919, Patent Number 332,257, granted November 12th, 1920; England July 10th, 1920, Patent Number 148,967, granted September 22nd, 1921), of which the following is a specification.

Various means have been proposed for damping the oscillations that the revolving shaft of a gyro compass executes across the meridian. In one arrangement such a means consists of a pendulum, or a body affected by gravity and similar to a pendulum. The arrangement of the gyro in this means is such that when the axis of the gyro is in its position of rest it extends in a direction at right angles to the line of gravity of the said pendulum or body, whilst as soon as oscillations occur, the motions of elevation of the gyro axis which are accompanied by these oscillations, result in the said angle of 90° being altered and this in turn causes an external force, as an air current, to be applied that opposes the oscillations about the north-south line and hence damps them.

In accordance with another arrangement a mass is shifted as soon as elevating oscillations occur, this mass then producing internal friction that dissipates the energy of oscillation.

The method employed in the present invention differs fundamentally from that used in the said arrangements in that no movable parts or shifting of masses are utilized, the required damping being obtained by a contrivance of extraordinary simplicity. To render the invention applicable certain preliminary requirements have to be fulfilled. These are: 1, that the compass is provided with a follow-up device that is caused to always follow the oscillations of the gyro about its vertical axis and that: 2, the indicating system of the compass is held at two points in such a manner that it is free to make elevating oscillations. A manner of fulfilling the latter requirement consists in providing an eye or hole at the top of the indicating system which embraces a positioning pin and in equipping the lower end of the system with a positioning pin that can shift in a guiding slot which is kept turned in the direction of the gyro axis. In this arrangement the center of the eye and the bottom pin are located in the axis of the compass card which extends at right angles to the axis of the gyro.

The invention consists in causing the said lower positioning pin to press against the cheek of the said guiding slot that lies at the west side when the gyro axis is turned into the north-south direction. It has been confirmed by experiment that this one-sided pressure results in a damping of the oscillations that grows as the pressure increases. But when the pin presses against the east cheek the swinging across or oscillations around the meridian line described by the gyro axis will be increased, i. e. the opposite of a damping effect results. The damping of the oscillations by the pin pressing against the west cheek, or the increase of these oscillations on the pressure being applied to the east cheek, is due to the fact that the force of the follow-up motor, which turns the slot cheeks so as to cause them to follow the motions of the gyro axis, is supplemented in the first case by the force of the oscillating compass system i. e. this system gives off energy to the follow-up motor whilst in the latter case this system receives energy from the motor.

The said one-sided pressure may be produced in various ways. A very simple method consists in loading the movable system in such a manner that its center of gravity is displaced from the axis of the compass card and shifted towards the east. A similar result would be obtained by loading the west side of the mercury vessel to which the cheeks forming the guiding slot are fixed so that, when the gyro has swung round so as to point steadily towards the north, the slot will no longer lie perpendicularly beneath the upper positioning pin, but will have shifted somewhat towards the east.

A constructional form of the invention is shown in the drawing in which some parts are shown in perspective and others in section in order to disclose their construction more clearly.

The indicating gyro 1, whose axis 2—2 swings round into the north-south direction as soon as the gyro is speeded up, is kept suspended by a float 3 in an annular vessel 4 partly filled with mercury. Fixed to the hood of the float is a plate 5 which carries a ball-shaped electric contact 6 that operates to control a follow-up device, the counter contacts 7 of the contact 6 being arranged on the vessel 4. Joined to the top of the vessel 4 is a hood 8 at the center of which a pin 9 is fixed that projects downwards into the cup-shaped middle part 10 of the hood of the float and passes through an eye 11 fixed in the bottom of the cup so as to center the float in the mercury vessel.

The gyro is positioned at its lower end by a pin 12 attached to its casing and adapted to oscillate in one direction only in a guiding slot formed by the two cheeks 13 and 14. The cheeks are connected by an arm 15 to the vessel 4 and they are set so close to each other that when the vessel 4 with its contacts 7 is caused to follow the movements of the gyro axis 2—2, the slot will also be continually kept extending in the direction from north to south. The vessel 4 is turned and caused to follow the motion of the gyro system 1, 2, 3, 5 by means of a motor 16 which, through the medium of a pinion 17, acts on a gearwheel 18 fixed to the hood 8 of the vessel 4. The motor is mounted on a disk 19 which is supported by a gimbal not shown the other ring 20 of which is pivoted in ring 22 which is suspended by springs 21 from the compass bowl.

A barrel attached to and projecting upwards from the disk 19 forms a ball bearing 23 in which an upper shaft portion of the vessel 4 is journalled and from which the vessel 4 is suspended. The said upper portion carries a compass card 24 which is adapted to turn with the disk 19 relatively to the steering mark 25.

The movable system of the compass which comprises the gyro 1, the float 3, and the plate 5, is first balanced so that its center of gravity lies in the vertical axis of the compass card, i. e. on the line drawn through the middle of the eye 11 and the pin 12. Then the vessel 4 with its attached parts and the plate 5 are balanced in such a manner that their center of gravity is situated in the plane which extends through the guiding slot 14, and the pin 19, so that, when the gyro is at rest in its casing, the slot lies in a vertical plane that extends through the pin 19.

On the gyro now being speeded up its axis will execute undamped elliptic oscillations in the well known manner, whilst the pin 9 will remain stationary in its position over the slot in which, on account of the elevation, the pin 12 would oscillate to and fro without pressing against the cheeks. These oscillations are damped in accordance with the invention by placing a weight 26 on the plate 5 on the east side of the same and by thus slightly shifting the center of gravity of the movable system out of the axis of the compass card towards the east so that the pin 12 is pressed against the cheek 13.

As mentioned above a similar result can be obtained by attaching the weight to the mercury vessel or to the guiding slot instead of associating it with the indicating system. In this case the weight would, of course, be arranged at the opposite side to that at which it is placed in the constructional form illustrated in the drawing.

I claim:

1. In a gyro compass having a gyroscope and a rotatable casing for vertically suspending the gyroscope rotatably in the casing to permit its spinning axis to swing into the meridian, a compass chart fixed on said casing and guiding pins operatively connected to the upper and lower portion of the gyroscope to vertically center it in the vertical axis of the compass chart, a pair of parallel cheeks attached to said casing and forming a guide slot adapted to receive and guide said lower guide pin, the slot direction coinciding with the North-South direction indicated on the compass chart, operating means connected to said gyroscope and to said casing for causing said casing to follow the horizontal movements of the gyro spinning axis and means for keeping said lower gyro guide pin and the cheek located on the west side of the chart axis in contact with each other at suitable pressure when the gyro spinning axis has swung into the meridian, for damping the oscillations of the gyro spinning axis about the meridian.

2. In a gyro compass having a gyroscope and a rotatable casing for vertically suspending the gyroscope rotatably in the casing to permit its spinning axis to swing into the meridian, a compass chart fixed on said casing and guiding pins operatively connected to the upper and lower portion of the gyroscope to vertically center it in the vertical axis of the compass chart, a pair of parallel cheeks attached to said casing and forming a guide slot adapted to receive and guide said lower guide pin, the slot direction coinciding with the North-South direction indicated on the compass chart, operating means connected to said gyroscope and to said casing for causing said casing to follow the horizontal movements of the gyro spinning axis, and means for loading one of the two elements, the rotatable casing or the gyroscope, laterally of the North-South line of the chart for keeping said lower gyro guide pin and the cheek located on the west side of the chart axis in contact with each other at suitable pressure when the gyro spinning axis has swung into the meridian, for damping the oscillations of the gyro spinning axis about the meridian.

3. In a gyro compass having a gyroscope and a rotatable casing for vertically suspending the gyroscope rotatably in the casing to permit its spinning axis to swing into the meridian, a compass chart fixed on said casing and guiding pins operatively connected to the upper and lower portion of the gyroscope to vertically center it in the vertical axis of the compass chart, a pair of parallel cheeks attached to said casing and forming a guide slot adapted to receive and guide said lower guide pin, the slot direction coinciding with the North-South direction indicated on the compass chart, operating means connected to said gyroscope and to said casing for causing said casing to follow the horizontal movements of the gyro spinning axis, and means for loading said rotatable casing on the east side of the North-South line of the chart for keeping said lower gyro guide pin and the cheek located on the west side of the chart axis in contact with each other at suitable pressure when the gyro spinning axis has swung into the meridian, for damping the oscillations of the gyro spinning axis about the meridian.

In testimony whereof I affix my signature in presence of two witnesses.

OSCAR MARTIENSSEN.

Witnesses:
WILHELM FISCHBURG,
KARL HANS BUSCH.